United States Patent [19]

Watkins

[11] 3,833,181

[45] Sept. 3, 1974

[54] MANUALLY ACTUATED TAPE REEL LATCH

[75] Inventor: Norman Watkins, Boulder, Colo.

[73] Assignee: International Business Machines Corporation, Armonk, N.Y.

[22] Filed: Feb. 9, 1972

[21] Appl. No.: 224,993

Related U.S. Application Data

[63] Continuation of Ser. No. 32,943, April 29, 1970, abandoned.

[52] U.S. Cl. .............................................. 242/68.3
[51] Int. Cl. .............................................. B65h 17/02
[58] Field of Search .......... 242/68.3, 68, 68.1, 68.2, 242/72, 72.1; 74/483 PB

[56] References Cited

UNITED STATES PATENTS

| | | | |
|---|---|---|---|
| 3,207,454 | 9/1965 | Bendar | 242/68.3 |
| 3,272,452 | 9/1966 | Cohen | 242/68.3 |
| 3,307,797 | 3/1967 | McFeaters | 242/68.3 |
| 3,366,343 | 1/1968 | Messamer | 242/68.3 |
| 3,464,642 | 9/1969 | Kobel | 242/68.3 |
| 3,490,716 | 1/1970 | Miller | 242/68.3 |
| 3,542,305 | 11/1970 | Feierabend | 242/68.3 |
| 3,544,027 | 12/1970 | Green | 242/68.3 |

*Primary Examiner*—John W. Huckert
*Assistant Examiner*—Edward J. McCarthy
*Attorney, Agent, or Firm*—Francis A. Sirr

[57] ABSTRACT

A tape reel latch which allows a reel of magnetic tape to be loosely positioned on a drive hub such that subsequent actuation of the latch is effective to couple the reel to the hub. An expandable rubber ring encircles the hub, under the reel, and is of a diameter less than the diameter of the hub so as not to interfere with the initial placement of the reel on the hub. A latching knob is mounted on the hub and is axially spring-biased away from the hub. A plurality of relatively long pins are circumferentially spaced to extend between the inside diameter of the rubber ring and a cam surface which is formed on the knob. Axial depression of the knob expands the rubber ring and causes the pins to move overcenter. The expanded rubber ring is effective to exert a force, through the pins, to the knob, to maintain the knob in this depressed position against the force of the axial spring bias. However, the rubber ring is effective to perform this function only when the ring is compressed against a reel. If a reel is not in place on the hub, the knob automatically returns to its original position, due to the axial spring bias.

8 Claims, 5 Drawing Figures

INVENTOR
NORMAN WATKINS
BY
[signature]
ATTORNEY

MANUALLY ACTUATED TAPE REEL LATCH

This is a continuation of application Ser. No. 32,943 filed Apr. 29, 1970, now abandoned.

BACKGROUND AND SUMMARY OF THE INVENTION

Prior art manual tape reel latches are found in a variety of configurations, generally of two basic types. The first type requires that the tape reel be mounted by pressing the reel itself against the drive hub, or some associated mechanism, in order to activate the latch. This type of latch is undesirable, particularly when the reel holds magnetic recording tape, since the force exerted on the reel during the latching operation tends to damage the contents of the reel.

The second type of tape reel latch allows the reel to be initially loosely placed on the drive hub. Other activating mechanism, independent of the reel, is then actuated to latch the reel into the hub. Latches of this second type are known wherein a relatively complicated overcenter mechanism is utilized to set the latch. The present invention relates to an improvement of this second type of reel latch. Specifically, the present invention provides a simple, low cost, structure wherein a single structural element both couples the drive hub and provides the force to set the latch, but only if a reel is in place on the hub.

The present invention utilizes the unique combination of a latching knob, a knob return force, an overcenter mechanism, and an expandable member, wherein the overcenter mechanism allows the knob to be set only if a reel is in place on the drive hub.

More specifically, a rubber-like ring is expanded by the overcenter mechanism as the knob is depressed. The expanded ring couples a reel to the drive hub, and the axial force then exerted on the knob, through the overcenter mechanism, overcomes the force of a knob return spring.

DESCRIPTION OF THE PREFERRED EMBODIMENT

Figure 1:
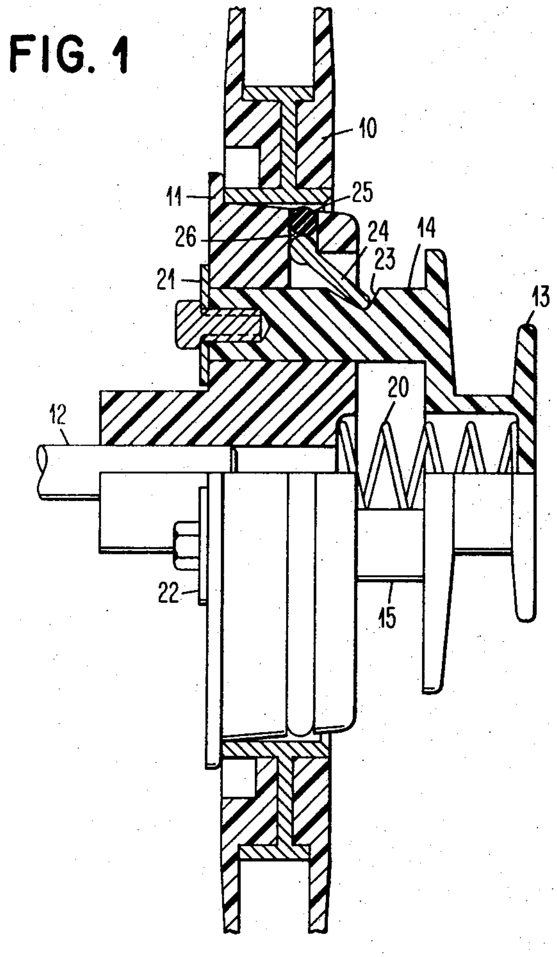
FIG. 1 is a side view, in partial section, of a preferred embodiment of the present invention; this view showing a tape reel positioned adjacent a drive hub prior to depressing the centrally located reel latch knob.
Figure 3:
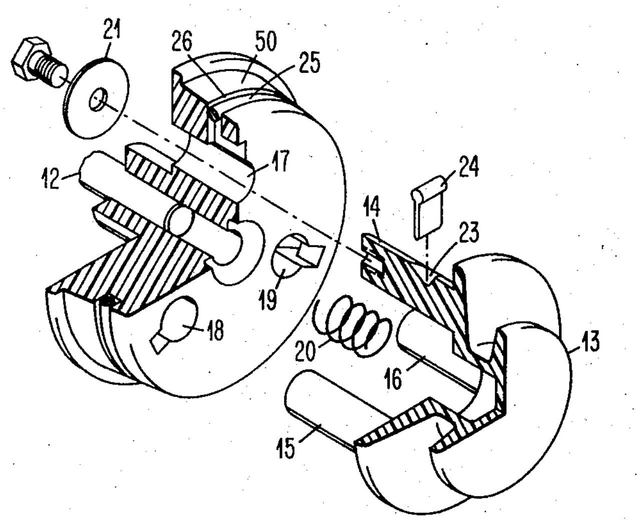
FIG. 3 is an exploded view of the reel latch of FIG. 1 showing the three 120° spaced pins which are carried by the knob.

Referring to FIG. 1, tape reel 10 is shown loosely positioned on drive hub 11, this drive hub being firmly attached to motor drive shaft 12 to rotate therewith. Hub 11 is mounted in a fixed horizontal position on shaft 12 to rotate therewith. Hub 11 is provided with annular shoulder 50 (see FIG. 3), concentric with shaft 12, and of a diameter less than the diameter of the reel mounting opening found in reel 10. The tape reel latch of the present invention includes an axially movable knob 13 which is mounted on hub 11 by means of three 120° spaced pins 14, 15, and 16; these pins being received by openings 17, 18, and 19 formed in hub 11 (FIG. 3).

Biasing means in the form of spring 20 axially biases knob 13 away from hub 11 a limited distance as determined by the engagement of the back surface of hub 11 and washers such as 21 and 22 carried by pins 14–16.

Each of the three pins 14–16 carries identical notches; the notch in pin 14 being identified by reference numeral 23. A radially extending overcenter toggle pin 24 is associated with each of the pins 14–16 and extends between the notch formed in its pins and the underside of a resilient ring-like member 25. Member 25 may, for example, be a rubber O-ring. Member 25 is positioned within an annular recess 26 formed in shoulder 50 of hub 11. The relaxed diameter of O-ring 25 is less than the outer diameter of drive hub 11, as shown in FIG. 1, so as not to interfere with initial placement of reel 10 on hub 11. However, once reel 10 is placed on hub 11, the reel is firmly attached to the hub to rotate therewith by manually depressing knob 13, moving it to the left from the position shown in FIG. 1 to the position shown in FIG. 2. From FIG. 2, it can be seen that the three overcenter toggle pins 24 have moved from a first position shown in FIG. 1, where the three pins are axially inclined in a direction to axially bias knob 13 away from hub 11, to an overcenter position (shown in FIG. 2) where the three pins 24 are now axially inclined in the opposite direction to axially bias knob 13 toward hub 11 against the force exerted by spring 20.

Figure 2:
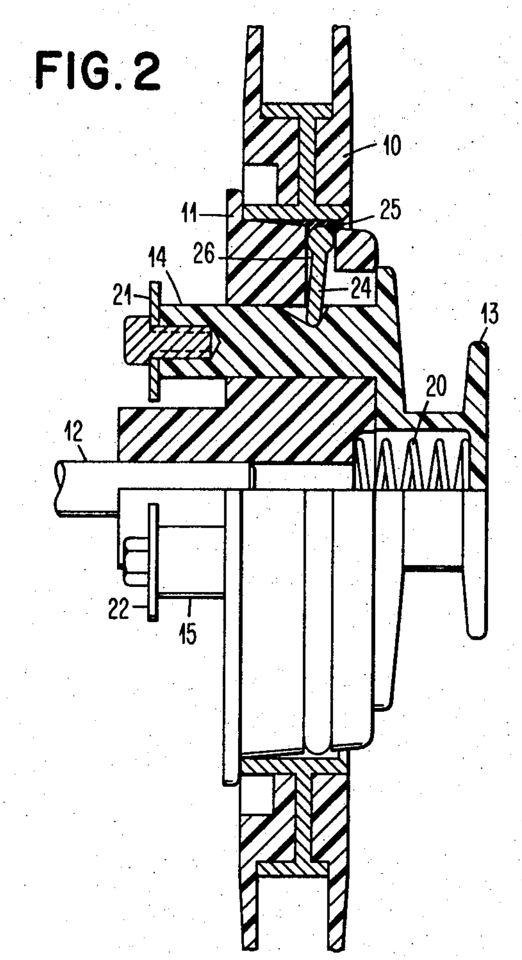
FIG. 2 shows the structure of FIG. 1 with the knob depressed.

If the tape reel 10 had not been in position on hub 11, the force exerted by O-ring 25 with knob 13 in the position shown in FIG. 2, would have been insufficient to overcome the axial bias of spring 20, and knob 13 would have automatically returned to the position shown in FIG. 1. However, with the reel in position, O-ring 25 is compressed against the inner surface of the hub of reel 10, and sufficient axial force is exerted through the three pins 24 to maintain knob 13 in its latched position, as shown in FIG. 2.

The three overcenter toggle pins 24 cooperate with O-ring 25 and knob 13 and are operable upon actuation of the knob to expand O-ring 25 to a diameter greater than the circular opening in the reel to thereby couple the reel to drive hub 11. Overcenter toggle pins 24 function only in the presence of the reel to maintain the knob in its depressed position against the axial bias force exerted by spring 20.

Figure 4:
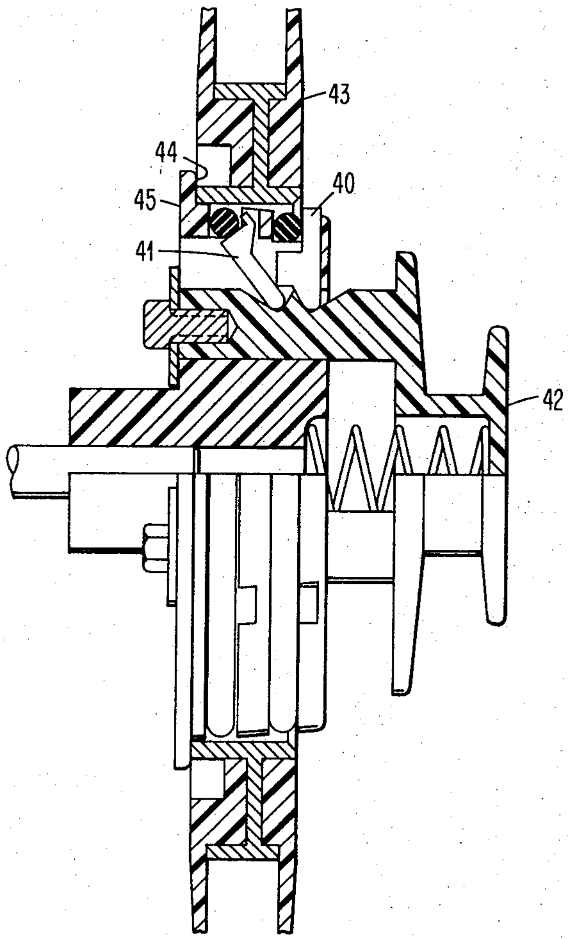
FIGS. 4 and 5 are views of a further reel latch which embodies the present invention, this latch additionally having three 120° spaced locating pins.
Figure 5:
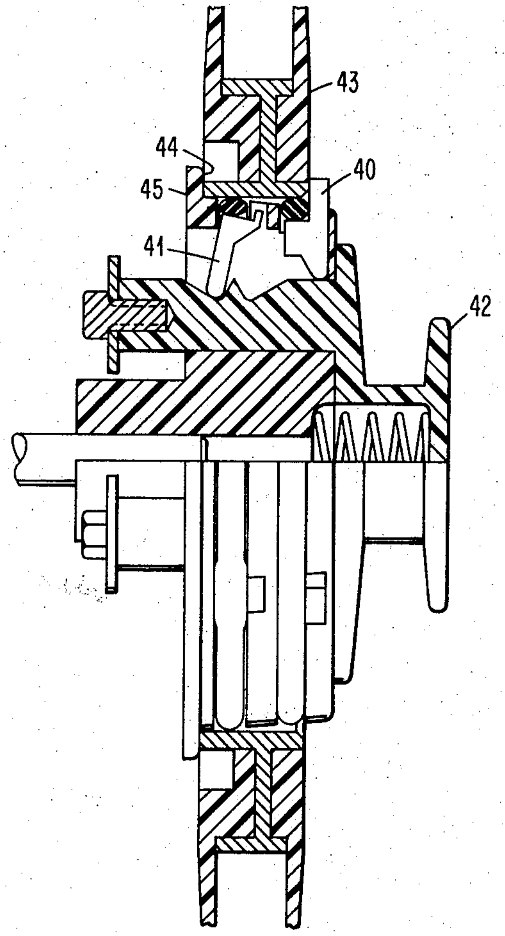

FIGS. 4 and 5 disclose a further reel latch which embodies the present invention and additionally provides three 120° spaced locating pins, one of which is identified by reference numeral 40. In the structure of FIGS. 4 and 5, overcenter toggle pin 41 (of which there are three) again functions to maintain knob 42 in its actuated position, as shown in FIG. 5, only when reel 43 is in place on drive hub 45. Additionally, locating pins 40 move radially outward as knob 42 is moved from the position shown in FIG. 4 to the position shown in FIG. 5. The function of pins 40 is to physically block axial movement of knob 42 to the left and, thus, prevent latching of the knob in the position shown in FIG. 5 unless tape reel 43 is properly seated against shoulder 44 formed in drive hub 45.

While the invention has been particularly shown and described with reference to a preferred embodiment thereof, it will be understood by those skilled in the art that various changes in form and details may be made therein without departing from the spirit and scope of the invention.

What is claimed is:

1. A manually actuated tape reel latch for use in detachably mounting a magnetic tape reel on a rotatable and axially fixed drive hub in which the tape reel is initially loosely placed in operative position on the drive hub and is then coupled thereto by latching action of an axially movable knob, the latch comprising:

a drive hub;

a resilient ring-like member positioned in an annular recess formed in the circumference of said hub, said ring-like member having a relaxed diameter substantially the same as the diameter of said hub;

an axially movable knob mounted on said hub, bias means axially biasing said knob away from said hub a limited distance to a stable unlatched position; and radially extending overcenter toggle means cooperating with said ring-like member and with said knob whereby axial movement of said knob toward said hub to a latched position and against the force of said bias means causes said toggle means to move overcenter to expand the diameter of said ring-like member such that said ring-like member engages the tape reel and couples the same to said hub, said toggle means being effective only in the presence of a tape reel to exert an axial force on said knob greater than said bias force and in the direction of the said hub, thereby causing said knob to be stable in said latched position.

2. A latch as defined in claim 1, wherein said ring-like member is a continuous ring formed of rubber-like material which is compressed against a tape reel during axial movement of said knob toward said hub.

3. A latch as defined in claim 2, wherein said radially extending overcenter toggle means comprise a plurality of circumferentially spaced and radially extending rigid pins, the inner ends of which engage notches which are formed in said knob, said pins moving from a first position where they are axially inclined in a direction to axially bias said knob away from said hub to an overcenter position where they are axially inclined in a direction to axially bias said knob toward said hub as said knob is moved to said latched position.

4. A latch as defined in claim 3, wherein said plurality of radially extending rigid pins, when in said overcenter position, maintain said ring expanded to couple the reel to said hub and wherein the expansion of said ring is effective to exert sufficient axial force on said knob in the direction of said hub to render the latched position stable only in the presence of a tape reel on said hub.

5. Mounting means for detachably mounting a reel on a drive shaft, the reel having a central mounting opening therein, said mounting means comprising:

a drive hub mounted in a fixed axial position on the shaft and rotatable therewith, said drive hub having an annular shoulder concentric with said shaft and of a diameter less than that of the reel mounting opening;

a resilient, expandable, ring-like member mounted on said hub, the relaxed diameter of said ring-like member being less than that of the reel mounting opening such that the reel may be initially loosely placed in operative position on said drive hub;

an axially movable knob mounted to rotate with said drive hub;

force means positioned between said knob and said drive hub to axially bias said knob away from said drive hub to a stable unlatched position; and overcenter toggle means cooperating with said ring-like member and with said knob and operable upon axial movement of said knob toward said drive hub to a latched position to expand said ring-like member to a diameter greater than the diameter of the reel mounting opening to thereby couple the reel to said drive hub, said overcenter toggle means additionally functioning only in the presence of the reel to axially bias said knob toward said drive hub by a force greater than that exerted by said force means, to thereby stabilize said knob in said latched position.

6. Mounting means as defined in claim 5 wherein said overcenter toggle means comprises a plurality of radially extending pins, the outer portion of which cooperate with said ring-like member and the inner portion of which cooperate with pin drive means formed in said knob, said pins being movable from a first position where they are axially inclined away from the shaft to an overcenter position where they are axially inclined toward the shaft, said pins in said overcenter position being effective to maintain said ring-like member in expanded condition.

7. Mounting means as defined in claim 6 wherein said drive hub includes an annular recess formed in said shoulder and wherein said ring-like member is a continuous ring of rubber-like material positioned in said recess.

8. Mounting means as defined in claim 7 wherein said recess is sufficiently larger than said ring to allow said ring to deform as it is compressed between the reel and the outer portion of said pins, said ring being effective only in the event that it is so compressed to maintain said pins in said overcenter position against the bias of said force means.

* * * * *